US012094282B2

(12) United States Patent
McKay, Jr.

(10) Patent No.: US 12,094,282 B2
(45) Date of Patent: Sep. 17, 2024

(54) PHYSICAL ARTICLE EXCHANGE USING A SAFE

(71) Applicant: American Security Products Co., Fontana, CA (US)

(72) Inventor: Donald Ray McKay, Jr., Wylie, TX (US)

(73) Assignee: AMERICAN SECURITY PRODUCTS CO., Fontana, CA (US)

( * ) Notice: Subject to any disclaimer, the term of this patent is extended or adjusted under 35 U.S.C. 154(b) by 171 days.

(21) Appl. No.: 17/565,182

(22) Filed: Dec. 29, 2021

(65) Prior Publication Data

US 2022/0122402 A1 Apr. 21, 2022

Related U.S. Application Data

(60) Continuation of application No. 16/562,205, filed on Sep. 5, 2019, now Pat. No. 11,232,669, which is a (Continued)

(51) Int. Cl.
*G07D 11/00* (2019.01)
*G07D 1/00* (2006.01)

(Continued)

(52) U.S. Cl.
CPC ........... *G07D 11/0087* (2013.01); *G07D 1/00* (2013.01); *G07D 1/02* (2013.01); *G07D 1/04* (2013.01);

(Continued)

(58) Field of Classification Search
CPC ........ G07D 1/00; G07D 1/02; G07D 11/0093; G07D 1/04; G07D 1/06; G07D 11/0087
See application file for complete search history.

(56) References Cited

U.S. PATENT DOCUMENTS 3,190,426 A * 6/1965 Cahill .................... G07D 11/10 902/11
3,690,332 A * 9/1972 Dykehouse .............. G07D 1/04 453/21

(Continued)

FOREIGN PATENT DOCUMENTS

JP 3304218 B2 * 7/2002
JP 2014016755 A * 1/2014

OTHER PUBLICATIONS

Machine translation of JP-3304218-B2, retrieved from JPO on Aug. 24, 2023 (Year: 2023).*

*Primary Examiner* — Christopher Stanford
(74) *Attorney, Agent, or Firm* — SoCal IP Law Group LLP; Angelo Gaz

(57) ABSTRACT

There are disclosed devices, system and methods for automatic exchange of change for cash using a smart safe. The safe has a computing device for receiving a selection from a merchant to exchange cash for change having a total value, and an identification of the denominations of the coins and cash of the change desired. The safe has a secure chamber for receiving cash deposits from the merchant and a sensor for counting the secured cash. The computing device sends an exchange agent the selection from the merchant to exchange the cash with the change, and the identification of the denominations of the change desired. A courier is contacted, retrieves the cash deposited, and exchanges the change for the equal value of cash.

23 Claims, 7 Drawing Sheets

© 2018 American Security Products Company

Related U.S. Application Data division of application No. 16/242,890, filed on Jan. 8, 2019, now Pat. No. 10,410,456.

(51) Int. Cl.
*G07D 1/02* (2006.01)
*G07D 1/04* (2006.01)
*G07D 11/32* (2019.01)

(52) U.S. Cl.
CPC .......... *G07D 11/0093* (2013.01); *G07D 11/32* (2019.01)

(56) References Cited

U.S. PATENT DOCUMENTS 3,768,616 A * 10/1973 Dykehouse .............. G07D 1/04 D20/4
4,638,434 A * 1/1987 Aizaki ............... G06Q 20/1085 235/133 R
4,940,162 A * 7/1990 Thie ......................... G07D 1/04 221/202
5,695,038 A * 12/1997 Keith, III .................. G07F 9/06 235/379
5,696,038 A 12/1997 Keith, III
5,813,510 A * 9/1998 Rademacher ............ G07D 1/04 235/379
5,883,371 A * 3/1999 Meeker ................... G07F 19/20 235/375
5,938,072 A * 8/1999 Lamoureux ............. G07F 11/44 221/253
5,984,509 A * 11/1999 Scott ....................... G07F 11/52 221/121
6,213,341 B1 * 4/2001 Keith, III ................. G07D 1/00 221/6
6,796,415 B2 * 9/2004 Angove .................. G07F 19/20 453/32
6,966,828 B2 * 11/2005 Smith ..................... G07F 9/002 453/18
7,063,252 B2 * 6/2006 Smith ..................... G07F 9/026 235/382
7,216,098 B1 * 5/2007 Brooks, Jr. .............. G07G 1/12 705/16
7,264,150 B1 * 9/2007 Moreland ............ G07G 1/0009 235/379
7,537,153 B2 * 5/2009 Hurwitz ............... G06Q 20/203 705/28
8,770,372 B2 * 7/2014 Dobbins ................ G07D 11/30 453/1
2004/0117061 A1 6/2004 Angove
2006/0253349 A1 11/2006 Brooks, Jr.
2009/0260948 A1 * 10/2009 Matsumoto .......... G07D 11/245 194/302
2010/0200448 A1 * 8/2010 Doi ........................... G07F 9/06 206/459.1
2011/0167000 A1 7/2011 Mon
2013/0200095 A1 8/2013 Dobbins
2013/0232064 A1 9/2013 Bosch
2016/0210801 A1 7/2016 Dobbins
2021/0074101 A1 3/2021 Pertz et al.

* cited by examiner

© 2018 American Security Products Company

200

210

© 2018 American Security Products Company

220

230

© 2018 American Security Products Company

240

250

© 2018 American Security Products Company

300

© 2018 American Security Products Company

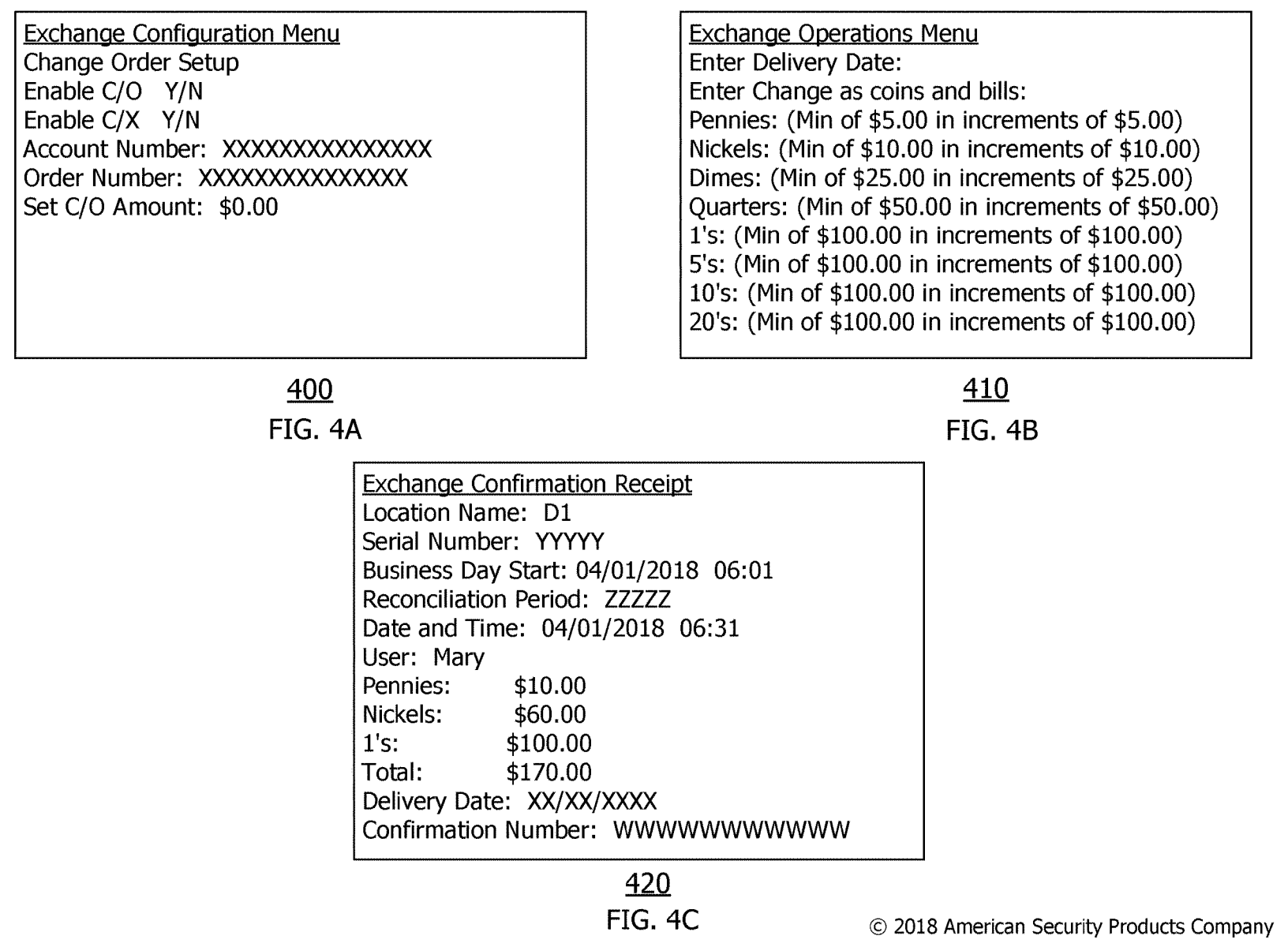

Exchange Configuration Menu
Change Order Setup
Enable C/O Y/N
Enable C/X Y/N
Account Number: XXXXXXXXXXXXXXX
Order Number: XXXXXXXXXXXXXXX
Set C/O Amount: $0.00

400

FIG. 4A

Exchange Operations Menu
Enter Delivery Date:
Enter Change as coins and bills:
Pennies: (Min of $5.00 in increments of $5.00)
Nickels: (Min of $10.00 in increments of $10.00)
Dimes: (Min of $25.00 in increments of $25.00)
Quarters: (Min of $50.00 in increments of $50.00)
1's: (Min of $100.00 in increments of $100.00)
5's: (Min of $100.00 in increments of $100.00)
10's: (Min of $100.00 in increments of $100.00)
20's: (Min of $100.00 in increments of $100.00)

410

FIG. 4B

Exchange Confirmation Receipt
Location Name: D1
Serial Number: YYYYY
Business Day Start: 04/01/2018 06:01
Reconciliation Period: ZZZZZ
Date and Time: 04/01/2018 06:31
User: Mary
Pennies: $10.00
Nickels: $60.00
1's: $100.00
Total: $170.00
Delivery Date: XX/XX/XXXX
Confirmation Number: WWWWWWWWWWW

420

FIG. 4C

© 2018 American Security Products Company

500

© 2018 American Security Products Company

PHYSICAL ARTICLE EXCHANGE USING A SAFE

RELATED APPLICATION INFORMATION

This patent application is a continuation of U.S. patent application Ser. No. 16/562,205 filed, Sep. 5, 2019, titled "Physical Article Exchange Using a Safe", which is a divisional of U.S. patent application Ser. No. 16/242,890 filed, Jan. 8, 2019, titled "Physical Article Exchange Using a Safe", issued on Sep. 10, 2019 as U.S. Pat. No. 10,410,456, the contents of both which are expressly incorporated herein.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to physical article exchange using a safe

Description of the Related Art

Safe systems have evolved from simple drop box technology to drop safe systems where a merchant makes a monetary deposit into a safe that counts the cash as it is deposited into the safe. A courier is dispatched on a schedule to retrieve the deposit, and transport the deposit to a third party such as a bank. The bank sends a confirmation to the customer that the deposit is at the bank. However, current safe systems do not provide a capability for physical article exchange using the safe.

DESCRIPTION OF THE DRAWINGS

FIG. 4A shows an exchange configuration menu into which the merchant can input a selection to exchange the cash for the change; and the minimum amounts and increments for the exchange.

FIG. 4B shows an exchange operations menu into which the merchant can input the denominations of cash and/or coins of the coins desired to be exchanged for the cash.

FIG. 4C shows an exchange confirmation receipt which the merchant can review to determine that the selection to exchange is for an exchange desired by the merchant.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Technologies described herein provide systems and methods for an automatic exchange of physical articles using a safe, such as the exchange of cash for coins. The system includes a smart drop safe that a merchant makes a monetary or cash deposit into, that counts the deposit, and that the merchant uses to request the exchange of some of the cash of the deposit for an equal monetary value of "change" with may be coins and/or cash. The safe may automatically detect the amount of cash deposited and send a message requesting the exchange which is received by an exchange agent and possibly a bank. In some cases, the exchange agent is a third party processor who controls and/or has direct communication with the safe; and who can forward the message requesting the request to the courier or a bank. The courier also receives a message requesting the exchange. The courier retrieves the cash and makes the exchange. Optionally, the safe then sends a message notifying the exchange agent and possibly the bank of the exchange. A transfer manager may receive messages from the safe and bank and manage the deposit and exchange. The merchant may buy, lease or rent the safe from and be a customer of the exchange agent.

Description of Apparatus

Figure 1:
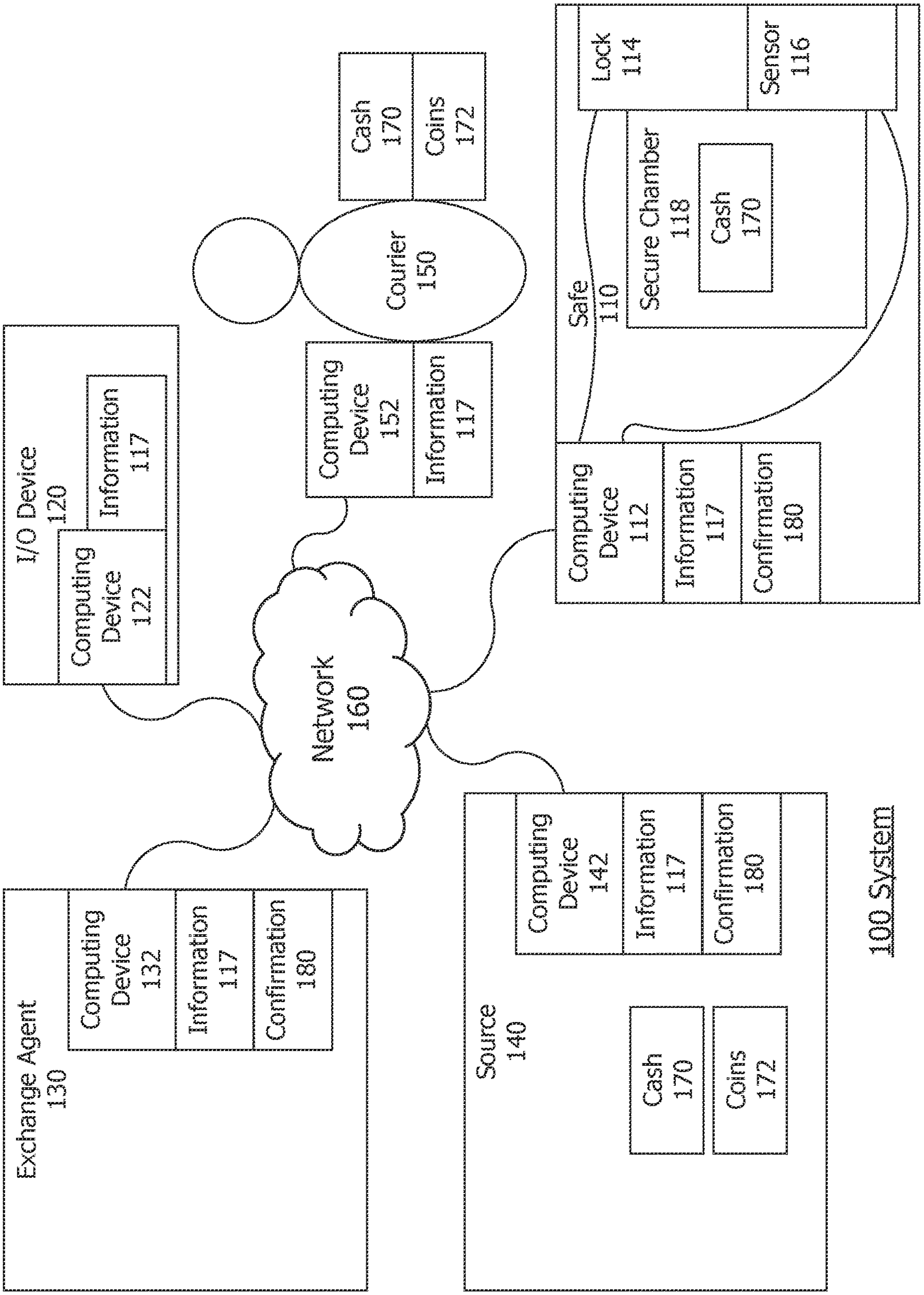
FIG. 1 is a system for physical article exchange using a safe.

Referring now to FIG. 1, there is shown a system 100 for physical article exchange using a safe 110, such as an exchange of coins 172 for an equal monetary value of cash 170, which may have been previously deposited in the safe. The system 100 includes the following system components: the safe 110, the input/output (I/O) device 120, the exchange agent 130, the bank/source 140, the courier 150 and the network 160. Each of the components includes a computing device such as computing device 500 of FIG. 5. Each of these computing devices is connected to the network 160 through a data connection as shown by the lines between each computing device and the network 160. Each system component's computing device may communicate with and transfer data to any of the other system component's computing device through the network 160 and the data connections between those components. The system 100 may include additional components.

Figure 3:
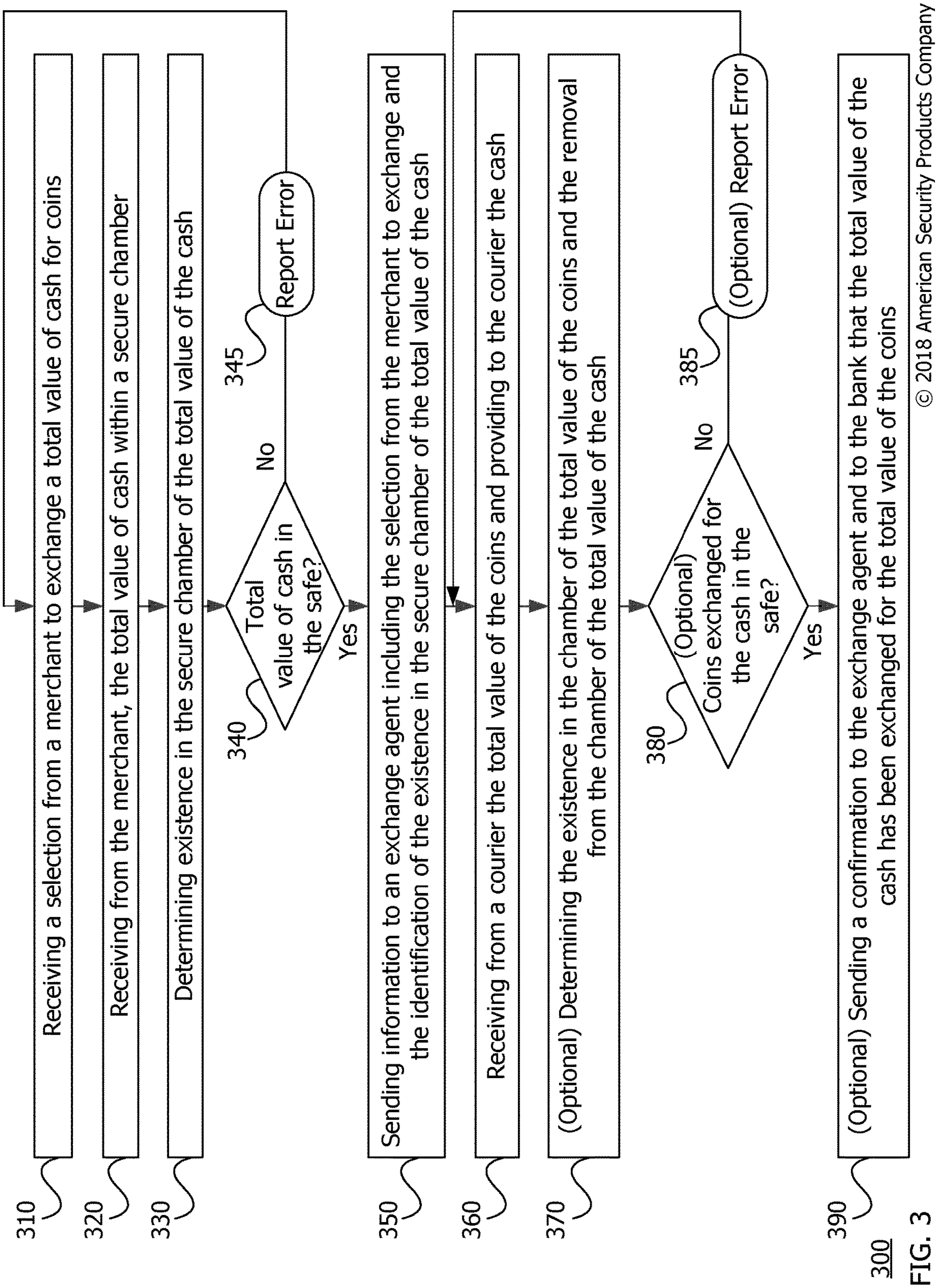
FIG. 3 is a flow chart of an operating environment/process for physical article exchange of coins for cash using the safe.

The safe 110 and/or the system 100 may manage the exchange of the coins 172 for the cash 170 by coordinating, tracking and reporting between the system components, a process of performing the exchange (e.g., see FIG. 3). The coordinating may be receiving a selection from a merchant at the safe 110 to exchange cash for coins and sending messages with the exchange information to other system components. The tracking may be sensing the cash deposited into the safe 100 and tracking the removal by a courier of the deposit amount from the safe 110. The reporting may be sending messages from the safe 110 to other system components identifying the cash deposited and optionally confirming occurrence of the exchange. In some cases, reporting can include reporting information for past deposits and exchanges.

The safe 110 may be a smart drop box that is used by a merchant to initiate a deposit process and/or exchange cash for coins process (e.g., see FIG. 3) which informs the exchange agent 130 of the deposit and/or exchange information. The safe 110 may be a safe located at a business such as a merchant's store selling goods and/or services. Such stores include a market, specialty retail store, restaurant, bar, clothing store, gym, gas station, furniture store, supermarket, movie theatre, bank, hotel, casino and the like. The safe 110 may also be located at a government facility (e.g., U.S. Navy commissary), educational facility (e.g., a high school cafeteria or merchandise shop), and the like. The safe 110 may be a smart (e.g., computer communication enabled) drop safe that such a business uses to deposit money that will be collected by a courier. The courier may be an agent or employee hired by the merchant or the merchant's bank (e.g., the source 140 of the coins for the exchange).

For example, a merchant (e.g., merchant 290 of FIGS. 2A-B) may make monetary deposits into the safe 110 which transmits the deposit information to a transfer manager for informing the merchant's bank of the deposits and confirming to the merchant that the deposits arrive at the bank. The transfer manager may be the courier 150, the agent 130 or the source 140. For example, the safe 110 may transmit the deposit information directly to the courier 150. The agent may send a courier to retrieve the deposits and deliver them to the bank. In addition, using technology described herein, the merchant may also select to exchange cash for change (e.g., a change order), and the safe 110 will send exchange information 117 that includes a monetary value of the cash to be exchanged and a breakdown of the values for the change in cash and coin denominations. Specifically, the merchant may use computing device 112 or 122 to initiate a deposit and/or exchange process which informs (e.g., sends the information 117 to) the exchange agent 130 (e.g., the transfer manager) which informs the source 140 (e.g., the bank) and/or the courier (e.g., courier 150) of the deposit and/or exchange information. Subsequently, the courier 150 obtains the change (e.g., from the source 140), and exchanges the change for the cash.

The safe 110 includes the computing device 112 which during various periods of time includes or stores selection information 117 and confirmation 180 for optionally confirming the exchange of the cash 170 for the coins 172. Each of selection information 117 and confirmation 180 may be computer data in at least one computer file. In some cases, the safe 110 can send a confirmation 180 of receipt of the deposit and/or optionally confirming the exchange, to computing devices of other system components based on the amounts and denominations of the coins 172 and the cash 170 identified at the safe 110.

The computing device 112 and/or the computing device 122 may be used by the merchant to initiate a deposit and/or exchange process, to inform (e.g., send the information 117 to) the exchange agent 130 which informs the source 140 which informs the courier of the deposit information. In some cases, the selection information 117 includes the selection and information input by the merchant at computing device 112 or 122 to make a deposit and/or exchange; and the confirmation 180 optionally includes the confirmation from the computing device 112 to the agent 130 and the source 140 of the completion of the deposit and/or exchange.

The safe 110 also includes lock 114 and sensor 116 attached to or as part of secure chamber 118. In some cases, the sensor 116 is optional and does not exist as part of the safe 110 or descriptions herein. The lock 114 and sensor 116 are connected through data connections to the computing device 112. These may be the same or separate data connections.

The safe 110 also includes secure chamber 118 which is a physical storage chamber, container, cassette, cartridge or box that during various periods of time includes or stores cash 170 and/or coins 172 (coins not shown in FIG. 1). The chamber 118 may be secure by only being accessible to a person having permission to open the lock 114 which secures the chamber.

The cash 170 may be paper or cash money; such as in proper denominations of United States dollars (USD) of paper or bill based legal tender. In some cases, the cash 170 is only paper money. In other cases, the cash 170 is cash and coin money. In some cases, the cash 170 is part of a total amount of money deposited into the chamber 118. In some cases, the cash 170 is not deposited into the chamber 118 but is held by the merchant 290 for exchanging with the coins 172 according to the information 117 (e.g., held after segment in time at FIG. 2A). The coins 172 may be metal or coin money; such as in proper denominations of United States cents (USC) of coin or change based legal tender. In some cases, the coins 172 are only coin money. In other cases, the coins 172 are cash and coin money desired or selected by the merchant to be exchanged for the cash 170. In one case, the coins 172 are smaller denominations of cash money selected by the merchant to be exchanged for larger denominations of the cash 170.

In some cases, each of the cash 170 and/or coins 172 are contained in and/or include a secure container such as a small version of the chamber 118 with or without a lock similar to lock 114. The container may include markings or an identification that describes what is in the container, or is a code for (e.g., a code that does not directly describe without deciphering) what is in the container. The identifications may be numbers, codes, magnetic codes, electronic codes, wireless codes or other indicia or media readable by the merchant, the sensor 116, the source 140 and/or the courier 150.

The lock 114 can secure the cash 170 and coins 172 within the chamber 118 such that they can only be accessed by a person having permission to access the chamber such as by having a key code, a lock combination, a magnetic code, an electronic code, a wireless code or other permission to open the lock 114. For example, the lock 114 may allow access to the chamber 118 during various periods of time by a merchant and/or courier 150 who has permission for access. The lock 114 may send data through the connection to the computing device 112 reporting opening and closing of the lock; and/or access to and securing of the chamber 118.

Figure 2A:
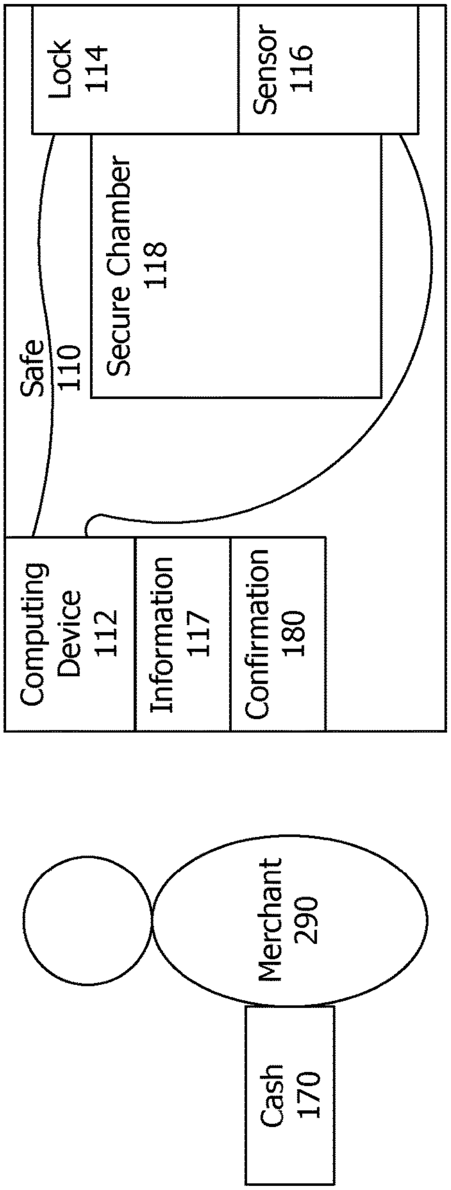
FIGS. 2A-B show segments in time when a merchant is making a selection to exchange cash for coins; and is depositing the cash into the safe.
Figure 2B:
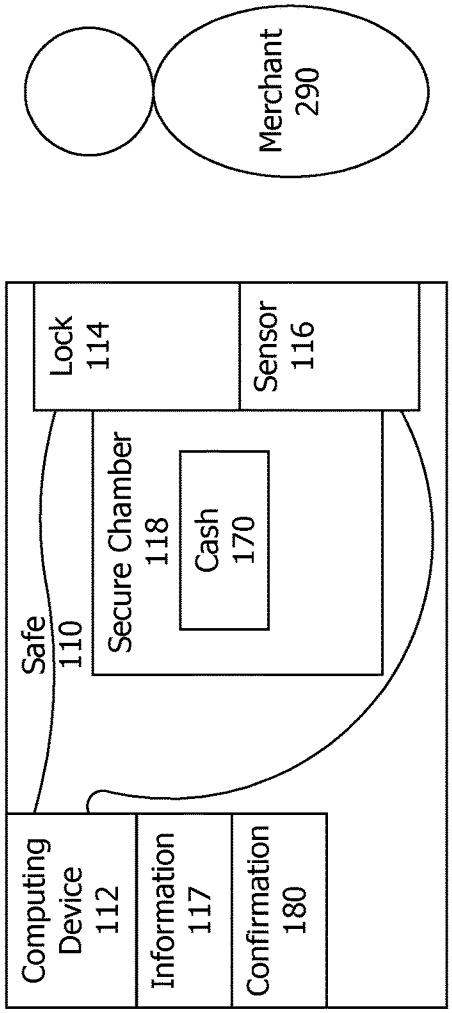

For example, FIG. 2A shows a segment in time 200 when the merchant 290 is making or has made a selection into computing device 112 to exchange the cash 170 for the coins 172. At time 200 the merchant not have deposited the cash 170 or a deposit including the value of the cash 170 into the safe 110 or into the chamber 118. FIG. 2B then shows a segment in time 210 when the merchant 290 has deposited or is depositing the cash 170 into the chamber 118 for the exchange. As noted, the cash 170 does not need to be deposited into the chamber 118 but can be exchanged by hand with the coins 172 between the merchant and courier. In this case, the merchant may maintain or store the cash 170 after FIG. 2A for exchange as per FIG. 2C-F. Making the selection at FIG. 2A or 2B may include the merchant logging into the device 112 such as using a merchant identification and password.

Making the selection at FIG. 2A or 2B may include the merchant putting higher denominational bills into the safe than only those of cash 170 (e.g., see at 320); and creating a change exchange amount of the value of change 172 desired (e.g., see at 310). A computer file can then be sent by the safe 110 to bank/courier/processor (e.g., see at 350) and the change order is later delivered by a courier 150 (e.g., see at 360).

The sensor 116 is able to detect the cash 170 within or deposited into the chamber 118. The chamber 118 may represent more than one chamber or cash cassette, each having a separate lock. In some cases, the sensor 116 is also able to detect the coins 172 if they are deposited within the chamber 118, such as by the courier 150 or merchant. The sensor 116 may include, for example, a coin slot, coin counter, bill slot, bill validator, bill reader, cash counter and/or currency detector. The sensor 116 may also detect the cash 170 and/or coins 172 by detecting a container and/or identification information of that container. This detection includes determining the total monetary value of each of, and denominations of each of the cash 170 and/or the coins 172 within the chamber 118 during various periods of time. It may include detecting or identifying existence in the chamber 118 of and the denominations of the total value of the cash 170 received by the chamber 118 at a point in time. It may include detecting or identifying existence of and denominations of each of: the total value of the coins 172 received by the chamber 118, and the total value of the cash 170 removed from the chamber 118 at a subsequent point in time. The sensor 116 may send data through the connection to the computing device 112 reporting any or all of these detections.

Referring back to FIG. 1, the input/output (I/O) device 120 may be a portable or remote user I/O device used to initiate a deposit and/or exchange process which informs the exchange agent 130 and/or the safe 110 of the deposit and/or exchange information. If it informs the safe 110, the safe may inform the agent 130 as noted herein. The I/O device 120 includes the computing device 122 which during various periods of time includes or stores the selection information 117. The computing device 122 may be used by a merchant to initiate a deposit and/or exchange process as noted for the computing device 112.

The safe 110 may be a separate device, remotely located at a separate location, building, room or miles away from the I/O device 120. In one case, the I/O device 120 is a remotely located computer, terminal, or other device as noted for computing device 500.

The exchange agent 130 may be a transfer manager to receive a merchant's initiation of a deposit and/or exchange process and inform the source 140 of the deposit and/or exchange information. The exchange agent 130 includes the computing device 132 which during various periods of time includes or stores the information 117. The computing device 132 may be used by a transfer manager that is informed of (e.g., receives information 117) a merchant's initiation of the deposit and/or exchange process and inform the source 140 of the deposit and/or exchange information. In some cases, the agent 130 can send a confirmation 180 of receipt of the deposit and/or optionally confirming the exchange to computing devices of other system components based on the amounts and denominations of the coins 172 and the cash 170 identified in data or messages received from the safe 110.

The source 140 may be a bank to receive a merchant's initiation of a deposit and exchange process and inform a courier of the deposit and exchange information. In some cases, the courier receives the merchant's initiation of a deposit and exchange process directly from the device 112, and not from the source 140. In some cases, the courier receives the merchant's initiation of a deposit and exchange process directly from the agent 130. The source 140 includes the computing device 142 which during various periods of time may include or store the information 117. The computing device 142 may be used by a source 140 to receive a merchant's initiation of the deposit and exchange process, inform the courier of the deposit and/or exchange information. In some cases, the source 140 can send a confirmation 180 of receipt of the deposit and/or optionally confirming the exchange to computing devices of other system components based on the amounts and denominations of the coins 172 and the cash 170 identified at the source 140. The source 140 may also store cash 170 and/or coins 172 during various periods of time.

The courier 150 may be a courier (e.g., a bank's courier) to receive the deposit and/or exchange information, obtain the coins 172, retrieve the deposits, perform the exchanges, and deliver the retrieved deposits to the source 140. As noted, the courier may receive the merchant's initiation of a deposit and/or exchange process (e.g., information 117) directly from the device 112, and not from the source 140. In other cases, the courier 150 may be mailed (e.g., regular mail) the deposit and/or exchange information from the safe 110, the agent 130 or the source 140. For this process, the merchant 290 may mail the cash 170 along with the information 117 to the courier 150, and in response, receive the change 172 (e.g., money in lower denominations) by mail from the courier 150. The "courier" may be a secure vehicle such as a truck that is operated by an agent or person employed to access and transport deposits by the merchant into the safe 110 to the source 150, and to perform the exchange of the coins 172 for the cash 170. The courier may be employed by, hired by, contracted by or otherwise controlled by the source 140. The courier 150 includes the computing device 152 which during various periods of time includes or stores the information 117. The computing device 152 may be used by the courier to receive a merchant's initiation of the deposit and/or exchange process. It may also be used to receive the monetary value of the deposit and/or exchange. In some cases, the courier 150 can send a confirmation 180 of receipt of the deposit and/or optionally confirming the exchange, to computing devices of other system components based on the amounts and denominations of the coins 172 and the cash 170 identified by the courier 150. The courier 150 also stores the monetary deposit, the cash 170 and/or the coins 172 during various periods of time.

Figure 2C:
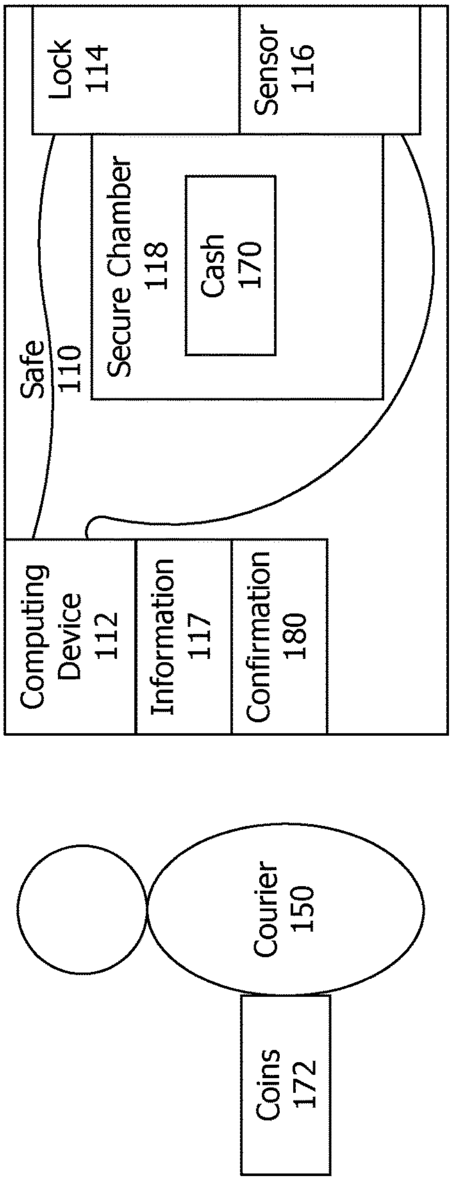
FIGS. 2C-F show segments in time when the courier is making the exchange.
Figure 2D:
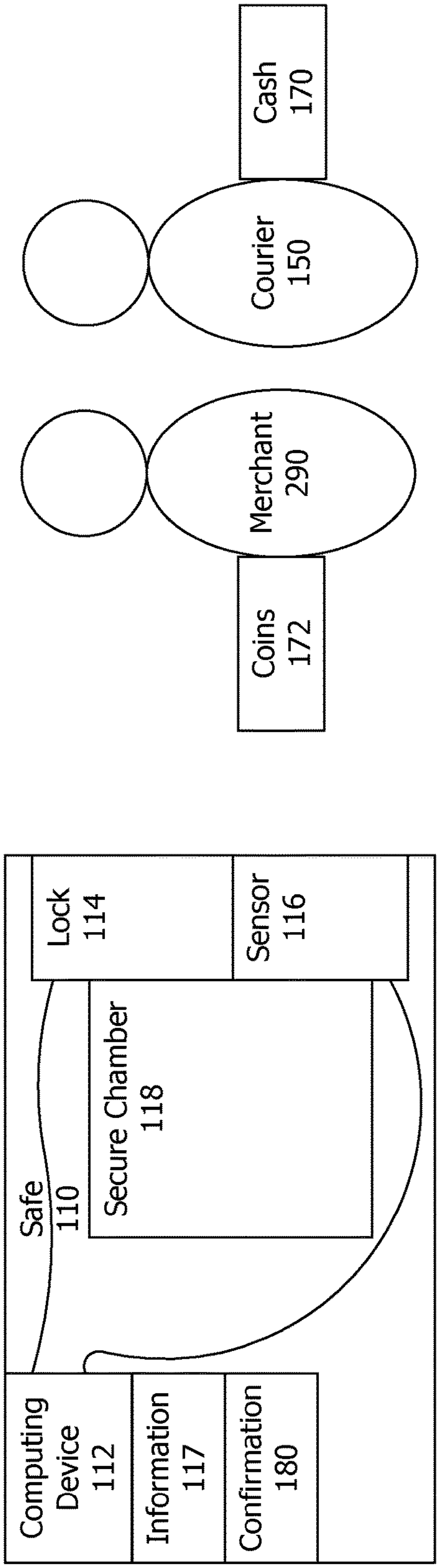

FIG. 2C-D show segments in time when the courier 150 is making the exchange. For example, FIG. 2C shows a segment in time 220 when the courier 150 is logging into the safe 110 to make the exchange such as by logging in to remove the cash 170 from the safe. Logging in at time 220 may include the courier 150 inputting into computing device 112 a selection to remove the cash and/or to exchange the coins 172 for the cash 170 (e.g., to make the exchange). Here, the courier 150 has the coins 172 to be exchanged for the cash 170. However, it is considered that the courier may log in and remove the cash 172 at a different time then when the courier provides the change 172 to the merchant. In some cases, the courier 150 inputs the selection to the computing device 152 instead of into the device 112, such as prior to the exchange.

FIG. 2D then shows a segment in time 230 when the merchant is receiving the coins 172 from the courier 150.

Receiving at time 230 may include the courier 150 exchanging the coins 172 for the cash 170 by giving the coins to the merchant 290 and removing the cash 170 from the safe. Giving and removing may happen during a single visit of the courier with the safe 110 with the merchant. In some cases, giving the coins 172 to the merchant happens prior to or after the courier 150 removes the cash 170 from the safe.

Figure 2E:
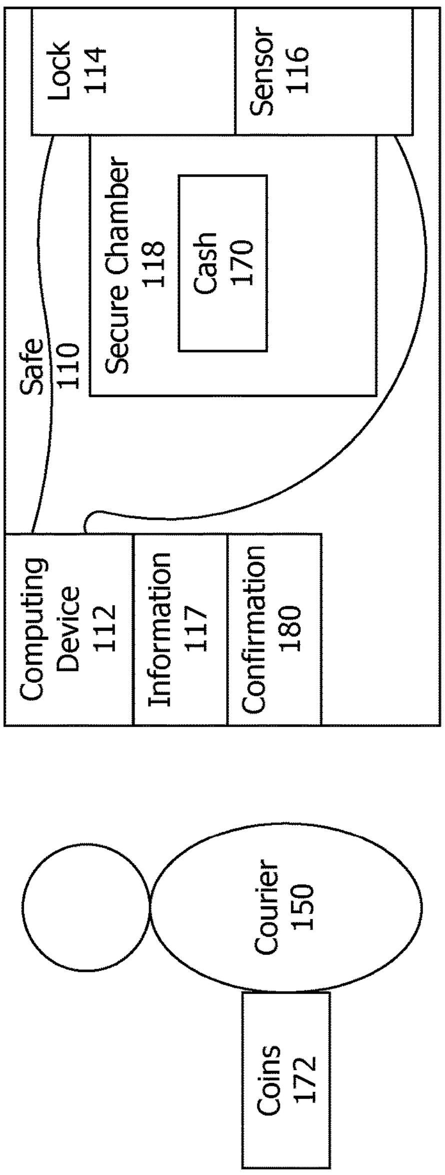
Figure 2F:
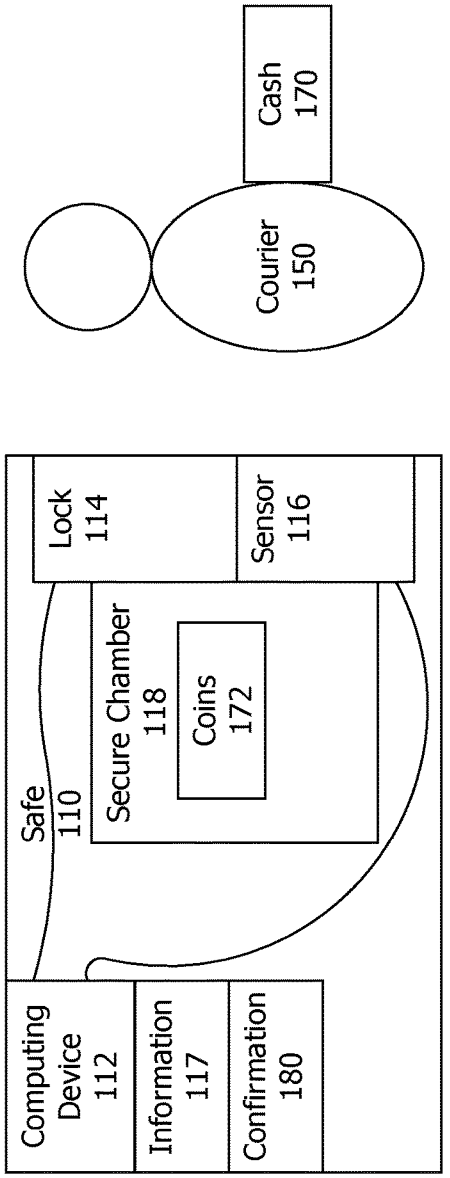

In some cases, the cash 170 may be in the safe 110 and the coins 172 may be deposited in the safe 110 by the merchant during or after the exchange. For example, FIG. 2E show a segment in time 240 when the courier 150 is logging into the safe at device 112 to make the exchange. This logging in may include inputting into computing device 112 a selection to exchange the coins 172 for the cash 170; and to remove the cash 170 (e.g., to make the exchange). Here the courier 150 has the coins 172 to be exchanged for the cash 170. In some cases, the courier 150 inputs the selection to the computing device 152 instead of into the device 112, such as prior to or after traveling to the safe 110 or merchant 290 to make the exchange. FIG. 2F then shows a segment in time 250 when the courier 150 has already exchanged the coins 172 for the cash 170 with the merchant 290 and the merchant or courier has deposited the coins into the safe 110.

In some optional cases of FIGS. 2C-F, after the cash 170 is deposited into the chamber 118, it is removed from the chamber and held by the merchant 290 for exchanging by hand with the courier 150 for the coins 172 according to the information 117. For example, when the courier logs in and makes the exchange at FIGS. 2C-D, the cash 170 may be with the merchant 290 instead of in the safe 110.

Figure 5:
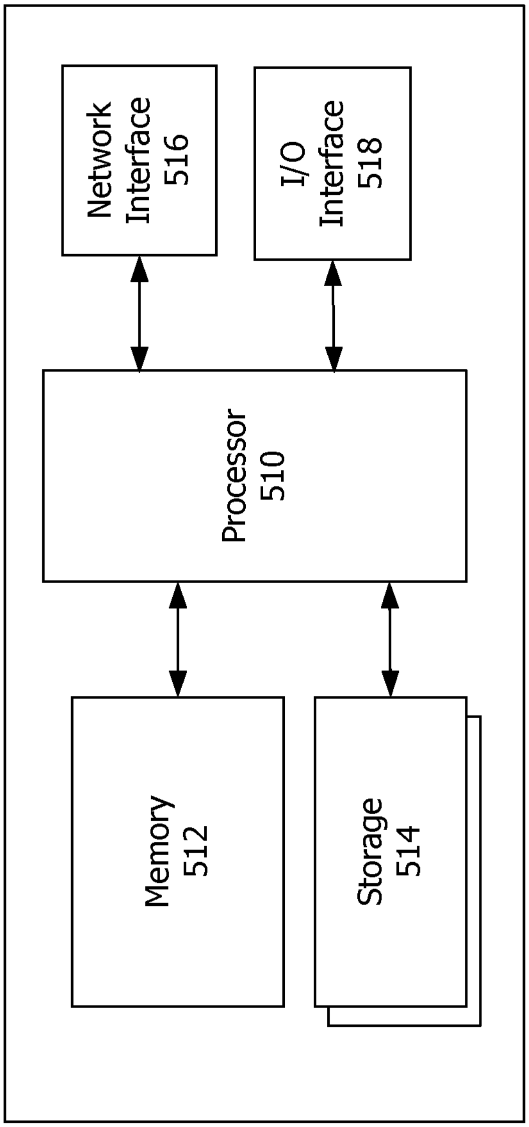
FIG. 5 is a block diagram of a computing device.

Each of computing devices 112, 122, 132, 142 and 152 may have all or some of the processor 510, memory 512, storage 514, network interface 516 and/or I/O interface 518 of computing device 500 of FIG. 5. Notably, each may have the network interface 516 for communication through data connection with the network 160 and with other components of the system 100. Also, each may have the I/O interface 518 for receiving selections from a user, merchant, courier, agent and/or source as noted herein. Moreover, each may have the I/O interface 518 for informing, reporting and/or confirming to a user, merchant, courier, agent and/or source as noted herein.

The network 160 may be a network that can be used to communicate as noted for the network attached to computing device 500 of FIG. 5. Each of the computing devices 112, 122, 132, 142 and 152 is connected to the network 160 through a data connection to send selection information 117 and/or confirmation 180 to other computing devices and/or system components of system 100 as noted herein. Each data connection may be or include network: connections, communication channels, routers, switches, nodes, hardware, software, wired connections, wireless connections and/or the like. Each data connection may be capable of being used to communicate network packets, network messages, telephone calls, faxes, signals, streams, arrays, selection information 117 and/or confirmation 180 as described herein.

Description of Processes

Using the system 100 and the connections shown it is possible to perform physical article exchange using the safe 110, such as by exchanging of coins 172 for cash 170 using the safe 110. As noted herein, in some cases, the exchange may be made using the safe, such as where the actual exchange of the coins for the cash is between a courier and merchant. For example, referring now to FIG. 3, a flow chart of an operating environment/process 300 for physical article exchange of coins for cash using the safe 110, such as for exchanging the coins 172 for the cash 170. The process 300 may be or describe an operating environment in which the system 100 can perform the exchange. The process 300 may be performed by the system 100. In some cases, the process 300 is performed at or by the safe 110. The process 300 starts at 310 and can end at 390, but the process can also be cyclical and return to 310 after 390. For example, the process may be performed when an exchange is desired, daily, every few days, weekly, and the like.

The process 300 starts at 310 where a selection is received from a merchant to exchange a total value of the cash 170 for the total value of the coins 172. The merchant may use a user input device of the I/O interface 518 of the computing device 112 or 122 to make the selection such as shown in FIGS. 2A-B. The “merchant” may be a store owner, employee, agent, analyst, administrator, or other person having permission to select an exchange.

Making the selection at 310 includes creating the selection information 117 at computing device 112 or 122, to exchange a total value of the cash 170 deposited in the safe 110 for an equal total value of the coins 172. For example, selecting at 310 creates the information 117 (e.g., upon completion of the selection at 310) which includes the selection to exchange (e.g., an acceptor transfer or fund change order (C/O), such as shown at FIG. 4A); the total value of cash for the total value of coins; and denominations of the cash and coins for the exchange(e.g., such as shown at FIG. 4B). Upon making the selection at 310, the merchant may receive a receipt confirming that the selection was successfully made (e.g., such as shown at FIG. 4C). The computing device 112 or 122 may automatically create the information 117 upon completion of receiving the selection at 310. The total value of the coins 172 selected for the exchange may optionally include bills, such as where lower value bills are requested to be exchanged for higher value bills of the cash 170. In some cases, the information 117 includes the breakdown of the denominations of bills that are the cash 170 (e.g., USD 5’s, 10’s, 20’s, 100’s, etc.) deposited and the breakdown of the denominations of coins and cash that are requested as the coins 172 (e.g., USD cents, nickels, quarters, etc.; and optionally USD 1’s, 5’s, 10’s, 20’s, etc.) to be exchanged for the cash 170 (e.g., see FIG. 4B).

In some cases, at 310 the merchant may select to exchange cash for the coins 172 that the merchant desires to use for making change to consumers at the business, prior to the next scheduled monetary deposit to the bank. That is, the selection to exchange may be needed for the store to continue with business with consumers who do not have change. Here, the selection may indicate that the merchant will provide the total value of cash 170 to the courier 150 or put it in the safe, for exchange with an equal value of coins 172 (e.g., see at 360), prior to making a regular scheduled monetary deposit to the bank. In some cases, the selection may indicate that the merchant will put the total value of cash 170 in the safe, and that the cash is to be removed and replace with an equal value of coins 172. The merchant can make a subsequent selection to exchange when more change is desired to use for making change.

On the other hand, as noted, the selection may be to make a deposit to the bank as well as for an exchange. Here, in addition to the exchange information, the information 117 created at 310 includes deposit information for a total amount of money deposited by the merchant. The deposit information may include a breakdown of the denominations of cash that is the total amount of money deposited (e.g., USD 1’s, 5’s, 10’s, 20’s, 100’s, etc.); and the breakdowns mentioned for the exchange information. Here, selecting at 310 may include selecting to deposit money to be sent to the source 140 and selecting to exchange the cash 170 for the coins 172, where a total monetary value of the exchange is a portion of a total value of money deposited in the safe 110 or for deposit. Also, the deposit information (e.g., a credit posting at the source 140 for this deposit by the merchant) may be a deposit for the total value of money deposited minus the total monetary value of cash selected to be exchanged. In other words, the value of the cash 170 to be exchanged can be restrict from being included in the daily credit posting at the source 140; and the processor (e.g., the source 140) could pull the currency exchange amount from the deposit once it has reached the currency processing facility. In other cases, the value of the cash 170 to be exchanged is included in the daily credit posting at the source 140; and the processor (e.g., the source 140) does not pull the currency exchange amount from the deposit once it has reached the currency processing facility.

FIG. 4A shows an exchange configuration menu 400 into which the merchant 290 can input a selection to exchange the cash 170 for the change 172; and the minimum amounts and increments for the exchange. For example, using menu 400, the minimum amounts and increments for the coins 172 and cash 170 are configurable by the merchant 290 (e.g., the customer). In some cases, the minimum amounts and increments are configured by an administrator customer user. The exchange configuration menu 400 and/or the selection using the menu 400 of FIG. 4A may be part of a process for physical article exchange of coins for cash using the safe 110, such as shown by process 300 of FIG. 3.

The menu 400 includes a yes/no field for requesting change; a yes/no field enabling a “Change Exchange” feature which enables or creates a change order selection; a field for an account number which may be in the system by being entered from a different menu; a field for an order number which may be generated by the device 112 such as upon filling in one or more of the other fields of menu 400; and a fillable field for selecting or setting a total monetary value of cash 170 to be exchanged for coins 172. After selecting the value of cash 170, the merchant may enter the denominations of cash and/or coins of the coins 172 to be exchanged.

For example, FIG. 4B shows an exchange operations menu 410 into which the merchant 290 can input the denominations of the coins 172 desired to be exchanged. The exchange operations menu 410 and/or the selection using the menu 410 of FIG. 4B may be part of a process for physical article exchange of coins for cash using the safe 110, such as shown by process 300 of FIG. 3.

The menu 410 includes a field for a delivery date for the change 172 to be exchanged. The delivery date field may be system generated by device 112 based on courier pick-up schedule and pick-up date of courier 150. Otherwise, it may be a fillable field. The fields for “Pennies” through “20’s” may be fillable fields for selecting the denominations of change 172 as coins and bills to be exchanged. After selecting the denominations of cash and/or coins of the coins 172 desired, the merchant may review a summary of the order and confirm the order which will cause the selection at 310 to be completed.

Referring again to FIG. 3, if there is an error in the total values of cash 170 and coins 172 selected at 310, computing device 112 can report an error by displaying an error message describing the error to the merchant 290, (e.g., using a peripheral of I/O interface 518) indicating the error. Such errors may occur when the total values of cash 170 and coins 172 are not equal values; or when the breakdown of denominations of either is not equal to the total value selected.

If there is an error in the selected exchange, the selection is canceled and the process 300 may return to 310 to receive a subsequent selection or correction of the prior selection from the merchant. If there is not an error on the values of cash 170 and coins 172 entered at 310, the process 300 continues to at optional step 320.

After 310, at 320 the safe 110 receives from the merchant, the total value of the cash 170, within the secure chamber 118. Receiving at 320 may be optional and not included in process 300, such as where the cash 170 will not be received by the chamber 118 or will be received then removed by the merchant and exchanged by hand with the courier 150 for the change 172. The merchant may use the lock 114 to secure the cash 170 having the total value to be exchanged within the chamber 118. As noted, FIGS. 2A-B show segments in time 200 and 210 when the merchant 290 is making a selection to exchange the cash 170 for the coins 172; and is depositing or putting the cash 170 into the chamber 118 for the exchange.

In some cases, receiving at 320 includes a deposit by the merchant into safe 110 or chamber 118 of a total value of cash 170 to be exchanged with an equal amount of coins. For example, at 320, the merchant deposits the cash 170 through a counter or sensor 116 into the chamber 118 over time. In other cases, the merchant may open the lock 114 using a permission code to access the secured chamber 118, place the total value of cash 170 to be exchanged in the chamber 118, then close lock 114 to re-secure chamber 118.

As noted, the depositing of cash 170 at 320 may be a deposit of a total value of money for which the value of cash 170 is only a portion. For example, the safes 110 may be receiving and/or counting (e.g., detecting the cash amount using sensor 116) money for a deposit over a period of time such as all day long, and some of that currency can be cash 170 used by the merchant for change exchange (e.g., see FIGS. 4A-C) up until the end of a day or until the safe is emptied. That is the value of money deposited or held by the merchant for the exchange may be greater than the value of cash 170 the merchant selected at 310 to exchange. Here, the value of money for the deposit to the source 140 (e.g., a credit posting for this deposit by the merchant) will be the total value of money deposited minus the total monetary value of cash 170 selected to be exchanged.

After 320, at 330 the safe 110 determines the existence in the secure chamber 118 of the total value of the cash 170. Determining at 330 may be optional and not included in process 300 in case where the cash 170 will not be received by the chamber 118 or will be received then removed by the merchant and exchanged by hand with the courier 150 for the change 172. It may also not be included in cases where sensor 116 does not exist. The merchant and/or safe 110 may use the sensor 116 to determine the existence of, the total value of and the denominations of the cash 170 to be exchanged that is deposited or received within the chamber 118.

In some cases, determining at 330 includes using sensor 116 to determine the total value of money and denominations of the cash 170 for exchange that is received at 320. The sensor 116 may automatically determine the total value and denominations upon completion of or during receiving the cash 170 at 320. For example, determining at 330 may include sensor 116 counting the cash of cash 170 deposited by the merchant at 320; and determining a total value of and denominations of each of the cash of cash 170 received by the chamber 118 at 320. This counting may mean that the merchant inputs the cash into a bill counter of the safe 110 to count the money; and then locks the lock 114. In some case, counting the cash 170 at 330 includes sensor 116 counting and determining the value of coins of the cash 170 received by chamber 118, such as when the merchant inputs the coins into a coin counter of the safe 110.

After 330, at 340 the safe 110 determines if at least the total value of the cash 170 exists in the safe 110. Determining at 340 is optional and not included in process 300, as noted for determining at 330 being optional. The merchant and/or safe 110 may use the computing device 112 to determine the existence within the chamber 118 of the correct total value of (and optionally the correct denominations of) the cash 170 selected at 310 to be exchanged. Determining at 340, may be automatically performed by the computing device 112 upon completion of determining the total value and denominations at 330.

In some cases, determining at 340 includes the computing device 112 comparing the amount of cash 170 deposited or counted with the amount of cash selected to be exchanged at 310 to determine whether to authorize the exchange to occur. The computing device 112 may compare the data of the total value of cash 170 in information 117 (e.g., selected for the cash 170 at 310) with the data from sensor 116 for the total value of cash 170 determined at 330.

If the value of money or cash deposited in the data from sensor 116 is not at least the value in information 117, then the exchange is not authorized, an error will be reported at 345, and the process 300 may continue to at 310. The reporting may include displaying an error message on a user device of computing device 122 and/or 112 to the merchant (e.g., using a peripheral of I/O interface 518) indicating that the amount deposited is insufficient for the selected exchange. Displaying the error message at 345 may also include sending an error message to the exchange agent 130 indicating the error.

If the value of money or cash deposited is at least the value in information 117, then the exchange is authorized and the process 300 continues to at 350 as noted below.

If the exchange is authorized at 340, or properly input at 310 in cases where 320-340 are optional, the safe 110 may use a peripheral of I/O interface 518 to display to or print for the merchant, a receipt of the authorized exchange. For example, FIG. 4C shows an exchange confirmation receipt 420 which the merchant 290 can review to determine that the selection to exchange at 310 and the cash 170 deposited at 320 for the change 172 are for an exchange desired by the merchants. The exchange confirmation receipt 420 of FIG. 4C may be part of a process for physical article exchange of coins for cash using the safe 110, such as shown by process 300 of FIG. 3.

The confirmation receipt 420 includes data fields showing a location name for the safe 110; a serial number for the safe 110; business day start time for the safe 110; a reconciliation period for the safe 110; date and time of the selection made at 310; a user name for the merchant selecting at 310; denominations of coins and bills selected at 310 for the coins 172 desired in the exchange; a total value of the coins 172 desired; a delivery date for the exchange selection made at 310; and a confirmation number for the exchange selection made at 310.

If the exchange identified in the confirmation receipt 420 is not what the merchant desires, the merchant may cancel the exchange and the process 300 may return to 310 to receive a subsequent selection.

After 340, at 350 the safe 110 sends the information 117 to the exchange agent 130. Sending to the agent 130 at 350 may include also sending the information 117 to the courier 150 or to the source 140 to perform the exchange, as noted herein. The information 117 sent may include the selection at 310 from the merchant, and the identification at 340 of the existence in the secure chamber 118 (e.g., of cash received at 320) of at least the total value of the cash 170 to be exchanged. The "exchange agent" may be an owner, manager, support agent, analyst, employee or administrator of the seller of the safe 110, of the computing device 112 and/or of software executing on the computing device 112.

In some cases, sending at 350 is the computing device 112 sending the information 117 to the computing device 132 of the exchange agent 130. The computing device 112 may automatically send the information 117 upon completion of authorization at 340. For example, at 350, the information 117 (e.g., the selected exchange at 310), may be sent from a network interface 516 of the computing device 112 thorough data connections and the network 160 to a network interface 516 of the computing device 132.

In some cases, prior to sending the information at 350, the computing device 112 confirms that a network connection can be made to send the information from the safe 110 to the exchange agent 130. Confirming the network connection can be made may include verifying that the immediately prior synchronization by the safe 110 with the network 160 was successful or may include initiation a new synchronization by the safe 110 with the network 160.

In some cases, process 300 includes additional processes prior to receiving at 360. For one example, after sending at 350, the exchange agent 130 may receive the information 117 sent by the safe 110, store the information 117 and send the information 117 to the source 140. The "source" may be a bank or financial institution that receives deposits made into the safe 110; and/or that hires, contacts, controls or employs courier 150.

Here, upon receiving the information 117 from computing device 112, the computing device 132 may automatically store the information in a memory 512 and/or 514 of that computing device 132; and send the information 117 using network interface 516 of the computing device 132 thorough data connections and the network 160 to a network interface 516 of the computing device 142.

After the agent 130 sends the information 117 to the source 140, the source 140 may receive the information 117 sent by the agent 130, store the information 117 and send the information 117 to the courier 150.

Here, upon receiving the information 117 from computing device 132, the computing device 142 may automatically store the information in a memory 512 and/or 514 of that computing device 142; and send the information 117 using network interface 516 of the computing device 142 thorough data connections and the network 160 to a network interface 516 of the computing device 152.

For a second example, after sending at 350, the exchange agent 130 may receive the information 117 sent by the safe 110, store the information 117 and send the information 117 to the courier 150. In this case, the computing device 132 sends the information 117 using network interface 516 of the computing device 132 thorough data connections and the network 160 to a network interface 516 of the computing device 152.

In some cases, the source 140 or the agent 130 modifies the information 117 that is sent to the courier 150 to be appropriate or have only information required for the courier to perform the access and transport of deposits by the merchant into the safe 110 to the source 150, and to perform the exchange of the coins 172 for the cash 170. For example, the source 140 or agent 130 may send and the courier 150 may receive information related to or derived from the information 117. In some cases, the courier 150 may receive information indicating that the courier is to exchange a container having the coins 172 for container having the cash 170, but not identifying the total value or breakdown of denominations of the coins 172 or the cash 170. In one case, the courier 150 may receive information derived from information 117 that includes the selection at 310 to make an exchange at 360, an identification of a container having the cash 170, and an identification of a container the courier has obtained having the coins 172. The identifications may be numbers, codes, magnetic codes, electronic codes, wireless codes or other indicia or media readable at least by the courier 150 or a device carried by the courier 150.

After the merchant, the source 140 and/or the agent 130 sends the information 117 (optionally modified as noted above) to the courier 150, the courier 150 may receive the information 117 sent, and store the information 117. Here, upon receiving the information 117, the computing device 152 may automatically store the information in a memory 512 and/or 514 of that computing device 152.

In addition, upon receiving the information 117, the courier 150 may prepare or the source 140 may prepare, such as by securing in a portable container, the requested breakdown of the denominations of cash and coins that are the total amount of money of the coins 172 for exchange, according to the exchange information 117. If the container is prepared by the source, the source may then provide physical access to the portable container to the courier 150. The courier 150 may physically secure the obtained container and/or coins 172, such as by securing it in a chamber similar to chamber 118 with a lock similar to lock 114 that is part of the courier's vehicle.

After the courier 150 receives and stores the information 117 (optionally modified as noted above), the courier 150 may login to the safe 110 and/or make a selection that is received by the safe 110 to exchange the total value of the coins 172 for the total value of the cash 170. The courier 150 may use a user input device of the I/O interface 518 interfaces of the computing device 112 or 152 to login and/or make the selection such as shown in FIGS. 1 and 2C-F. This selection to exchange may be or include the safe 110 receiving from the courier 150 a selection to exchange the total value of the coins 172 with the merchant 290 for the total value of the cash 170 (which may or may not have been in the secure chamber 118) such as shown in FIGS. 1 and 2E-F.

As noted, the information 117 created at 310 may include deposit information for a total amount of money deposited by the merchant as well as the exchange information; and/or information 117 as modified by the source 140 or the agent 130. Here, logging in or selecting by the courier 150 may include selecting to retrieve deposit money (e.g., including cash 170) to be sent to the source 140 and selecting to exchange the coins 172 for the cash 170. For example, this selection may include a selection by the courier 150 at computing device 112 or 152 to make an exchange of a total monetary value of cash (e.g., the cash 170) that is a portion of a total value of money deposited in the safe 110 as noted for the merchant's selection at 310.

After 350, at 360 the total value of the coins 172 is received from the courier 150 and the total value of the cash 170 is provided to the courier 150. This may describe making the exchange selected at 310. In some cases, at 360 the courier 150 also selects to exchange the coins for cash; and exchanges the total value of the coins 172 for the total value of the cash 170. Receiving at 360 may include the courier 150 logging into the safe 110 to remove the cash 170 and/or to make the exchange as noted above for sending at 350. Logging into the safe include the courier 150 inputting a courier identification or username; and a password. In some cases, logging into the safe includes the courier using or inputting an electronic key or combination into the safe or device 112. In some cases, it also includes the merchant logging in during a time while the courier is logged in so that they are both logged in as having dual custody of the safe contents. The merchant logging in may be performed using a password, electronic key or combination as noted for the courier.

In some cases, receiving at 360 includes the courier 150 or merchant 290 removing the cash 170 from the safe that has been validated in the bill readers of the safe such as noted at 320. It may also include that when the courier is onsite at the safe 110, the courier 150 logs into the safe and remove the funds 170 from a cash cassette (e.g., "container" herein) or chamber 118. This cash 170 may or may not include an exact amount of the change exchange amounts of the value of change 172. The physical courier onsite 150 may have no idea of what is in the safe or the value of cash 170. In some cases, the courier 150 does not input or deposit the change 172 into the safe. In some cases, the courier 150 logs into the safe 110 with or without the customer being present at the safe and remove the funds 170 from the cassettes of the safe.

In some cases, when receiving at 360, the courier does not need to input the amount of change 172 being delivered and only delivers the change 172 to the merchant. The safe has no knowledge if the value of change 172 actually delivered is correct. During the pick-up, the courier takes the value of cash 170 from the cassettes in the safe 110 regardless if it matches the change exchange value of change 172 because there are store sales deposits in the cassettes with the cash 170 as well as the value of the change 172. The funds are comingled. As noted, FIGS. 2C-F show examples of segments in time when the courier 150 is making the exchange.

In some examples, this exchange may be between the courier 150 and the merchant 290. Here, after 350, at 360 the merchant 290 receives from the courier 150 the total value of the coins 172; and the merchant or safe provides the courier 150 the total value of the cash 170 at the same or at a different visit by the courier 150. Here, the merchant 290 may use the lock 114 to access a deposit and/or the cash 170 value to be exchanged in the chamber 118. Here, the merchant 290 may optionally use the lock 114 to secure the coins 172 within the chamber 118. For example, at 360 the merchant 290 may open the lock 114 using a permission code to access the secured chamber 118.

In some other examples, this exchange is between the courier 150 and the safe 110. Here, after 350, at 360 the safe 110 receives from the courier 150 the total value of the coins 172 and provides the courier 150 the total value of the cash 170. Here, after, the courier 150 selects to exchange the coins for cash, the courier 150 secures the total value of the coins 172 within the chamber 118 and removes the total value of the cash 170 from the secure chamber 118.

As noted, the deposit at 320 may be a deposit of a total value of money for which the total monetary value of cash 170 of the exchange at 360 is only a fraction or a portion. Here, the value of money for the deposit to the source 140 (e.g., a credit posting for this deposit by the merchant) will be the total value of money deposited minus the total monetary value of cash 170 selected to be exchanged.

After 360, at optional step 370 the safe 110 determines the existence in the secure chamber 118 of the total value of the coins 172 and the removal from the chamber 118 of the total value of the cash 170. In some cases, determining at 370 is not included in process 300 such as when the exchange is between the courier 150 and the merchant 290; or when sensor 116 does not exist on the safe 110. In one case, determining existence of the cash 170 and/or the coins 172 at 370 does not occur when the cash 170 and/or the coins 172 are not deposited in or received by the chamber 118 at 320 and/or 360, respectively. At 370, the courier 150, merchant 290 and/or safe 110 may use the sensor 116 to determine the existence of, the total value of and the denominations of the coins 172 secured in and the cash 170 removed from the chamber 118.

In other cases, determining at 370 is determining whether the total value of money and denominations of the coins 172 was exchanged for the cash 170 at 360. Here, at 370, the courier 150 and/or merchant 290 may determine the exchange of the total value and denominations of cash for coins upon completion of the exchange at 360. For example, determining at 370 may include the courier 150 and/or merchant 290 counting the cash 170 and the coins 172 exchanged at 360. In some cases, counting the cash 170 was performed automatically by the safe or sensor 116 at 330 and counting the coins 172 is performed by the merchant at 360 or 370. The merchant may count the change 172 at 370 after the courier has departed with the cash 170 and prior to securing the coins 172 in the safe at 370. This counting may mean that the courier 150 and/or merchant removes the cash 170 and inputs the coins 172 into the safe 110; and then locks the lock 114. In some cases, the courier 150 and/or merchant removes a container having the cash 170 from the chamber 118 and deposits a container having the coins 172 into the chamber 118 and then locks the lock 114. In some case, counting the coins 172 at 370 includes counting coins of the coins 172 deposited by the courier and received by the chamber 118 at 360, such as with a coin counter of the safe 110 that the courier deposits those coins into.

After 370, at optional step 380 the safe 110 determines if at least the total value of the coins 172 exists in and the cash 170 is removed from the safe 110. In some cases, determining at 380 is not included in process 300 such as noted for determining at 370. At 370, the courier 150, merchant 290 and/or safe 110 may use the computing device 112 to determine the existence within the chamber 118 of the correct total value of (and optionally the correct denominations of) the coins 172 selected at 310 and/or by the courier 150 after 350 to be exchanged. Determining at 380, may be automatically performed by the computing device 112 upon completion of determining the total values and denominations at 370.

In other cases, determining at 340 is determining whether the total value of money and denominations of the coins 172 was exchanged for the cash 170 at 370. Here, at 370, the courier 150 and/or merchant 290 may determine whether the exchange was determined to have occurred properly at 370. For example, the computing device 112, the courier 150 and/or merchant 290 may compare the data of the total values of the coins 172 and the cash 170 in information 117 (e.g., selected for the cash 170 at 310) or selected by the courier 150 after 350 with the data for the total value of coins 172 and cash 170 determined at 370.

If the value identified for the coins 172 and the cash 170 in the data at 370 is not what was selected and is not equal, then the exchange has not occurred properly, an error will optionally be reported at 385, and the process 300 may continue to at 310. In some cases, reporting at 380 is not included in process 300 such as noted for determining at 370. The optional reporting at 385 may include displaying an error message on a user device of computing device 152, 132 142 and/or 112 to the courier 150 (e.g., using a peripheral of I/O interface 518) indicating that the amount is not what was selected and/or is not equal. Displaying the error message at 385 may also include sending an error message to the exchange agent 130 and/or courier 150 indicating the error.

If the value identified for the coins 172 and the cash 170 in the data at 370 is what was selected and is equal, then the exchange has occurred properly, and the process 300 continues to at 390.

If the exchange has occurred properly at 380, the safe 110 may use a peripheral of I/O interface 518 to display to or print for the merchant 290 and/or the courier 150, a receipt of the proper occurrence of the exchange. For example, this receipt may be similar to that shown for receipt 420 of FIG. 4C but with the date and time identifying the date and time the courier made the exchange; and the user identifying the courier 150.

If the exchange has not occurred properly at 380, the merchant 290 and/or the courier 150 may cancel the occurrence of exchange and the process 300 may return to 360 so that the courier can subsequently retry the exchange. For example, the courier may have tried to exchange set of coins for another smart safe (e.g., the wrong cons) as the coins 172 or the source 140 may have provided the wrong coins 172 to the courier.

In this case, the reporting at 385 may indicate to the device 150, 130 140 and/or safe 110 that the exchange is not reconciled and that the change order is not complete. It may also report that the value of coins 172 for cash 170 has or has not been left in the safe 110 by the courier 150.

After 380, at 390 the safe 110 optionally sends the confirmation 180 to the exchange agent 130 and to the source 140 that the total value of the cash 170 has been exchanged for the total value of the coins 172. In some cases, sending at 380 is not included in process 300 such as where the exchange at 360 is not confirmed, or is confirmed through another process such as at 310 when the merchant makes a subsequent request. In some cases, the confirmation also goes to the merchant 290. It may go to the courier 150 as well. The optional confirmation 180 sent includes the selection and information 117 at 310 from the merchant; and the identification at 380 of the exchange.

In some cases, optionally sending at 390 is the computing device 112 optionally sending the confirmation 180 to the computing device 132 and 152. The computing device 112 may optionally automatically send the confirmation 180 upon completion of proper occurrence at 380. For example, at 390, the optional confirmation 180 may be sent from a network interface 516 of the computing device 112 thorough data connections and the network 160 to a network interfaces 516 of the computing devices 132 and 142. In some cases, prior to sending the confirmation 180 at 350, the computing device 112 confirms that a network connection can be made as noted at 350.

In some cases, based on receiving the information 117 and/or prior information 117 at 350, the agent 130 and/or source 140 may prepare reports, stored the reports and provide access to the reports to the merchant 290, agent 130 and/or source 140. In some cases, the reports are also based on receiving the confirmation 180 and/or prior confirmations. These actions may be automatically, performed by the computing devices 132 and/or 142. They may be periodically performed every reconciliation period, weekly, based on another period, and/or when requested by any of the system components. In some cases, the reporting may be sending messages identifying the cash deposited, confirming occurrence of the exchange, and having report information regarding current and past deposits and exchanges.

For example, the exchange agent 130 may send a report including for each exchange of the coins 172 for the cash 170 selected at 310, the locations, dates and times of: the selection from the merchant to exchange (e.g., the change order); denominations of the total cash value of the cash and denominations of the total cash value of the coins; the total value of the cash that existed in the safe; the total value of the coins that existed in the safe and the total value of the cash that was removed from the safe; the confirmation, and the reduced total monetary value sent to the source (e.g., the credit posting).

The report may be available to a merchant, company or customers of the agent 130 for multiple locations of multiple safes 110 for multiple days. This report can be configurable to auto email the merchant, company or customers in various data formats such as comma-separated values (CSV), portable document format (PDF) and Microsoft Excel™ formats.

In some cases, the exchange of coins for cash described herein may be an exchange of a first set of one or more physical articles for a second set of one or more physical articles. In this case, cash 170 and coins 172 may be physical articles such as memorabilia, heirlooms, movie scripts, audio recordings, personal property, art, weapons, jewelry, stocks, bonds, artifacts, photos, medication, drugs, metal, minerals, precious stones and the like. For example, at 310 the merchant may use computing device 112 or 122 to initiate a selection for a physical article exchange using the safe 110, such as by exchanging two different sets of physical articles in the safe 110. Consequently, the cash 170 of FIGS. 1-4 may be replaced with the first set of one or more physical articles and the coins 172 of FIGS. 1-4 may be replaced with the second set of one or more physical articles In one case, the merchant may select to exchange and the exchange that occurs may be an exchange of sports memorabilia (e.g., Ram's NFL™ singed jersey and football as cash 170) for other sports memorabilia (e.g., Ram's NFL™ singed player pictures as coins 172). In another case, the merchant may select to exchange and the exchange that occurs may be an exchange of a famous painting (e.g., Sunrise by Monet as cash 170) for a high end weapons (e.g., AR-15 rifles, pistols, knives and/or swords as coins 172). In a third case, the merchant may select to exchange and the exchange that occurs may be an exchange of an original script of Star Wars™ (e.g., as cash 170) for an underground recording of a Beatles live performance (e.g., as coins 172).

FIG. 5 is a block diagram of a computing device 500. The computing device 500 may be representative of the computing device 112, 122, 132, 142 and/or 152, herein. The computing device 500 may be a desktop or laptop computer, a server computer, a client computer, a network router, a network switch, a network node, a tablet, a smartphone or other mobile device. The computing device 500 may include software and/or hardware for providing functionality and features described herein. The computing device 500 may therefore include one or more of: logic arrays, memories, analog circuits, digital circuits, software, firmware and processors. The hardware and firmware components of the computing device 500 may include various specialized units, circuits, software and interfaces for providing the functionality and features described herein. For example, a system of the safe 110 or the components of system 100 may perform a physical article exchange of coins for cash using the safe 110, such as by exchanging the coins 172 for the cash 170 in the safe 110.

The computing device 500 has a processor 510 coupled to a memory 512, storage 514, a network interface 516 and an I/O interface 518. The processor 510 may be or include one or more microprocessors, field programmable gate arrays (FPGAs), application specific integrated circuits (ASICs), programmable logic devices (PLDs) and programmable logic arrays (PLAs).

The memory 512 may be or include RAM, ROM, DRAM, SRAM and MRAM, and may include firmware, such as static data or fixed instructions, BIOS, system functions, configuration data, and other routines used during the operation of the computing device 500 and processor 510. The memory 512 also provides a storage area for data and instructions associated with applications and data handled by the processor 510. As used herein the term "memory" corresponds to the memory 512 and explicitly excludes transitory media such as signals or waveforms.

The storage 514 provides non-volatile, bulk or long-term storage of data or instructions in the computing device 500. The storage 514 may take the form of a magnetic or solid state disk, tape, CD, DVD, or other reasonably high capacity addressable or serial storage medium. Multiple storage devices may be provided or available to the computing device 500. Some of these storage devices may be external to the computing device 500, such as network storage or cloud-based storage. As used herein, the terms "storage" and "storage medium" correspond to the storage 514 and explicitly exclude transitory media such as signals or waveforms. In some cases, such as those involving solid state memory devices, the memory 512 and storage 514 may be a single device.

The network interface 516 includes an interface to a network such as a network that can be used to communicate network packets, network messages, telephone calls, faxes, signals, streams, arrays, information 117 and/or confirmation 180 as described herein. The network interface 516 may be wired and/or wireless.

The I/O interface 518 interfaces the processor 510 to peripherals (not shown) such as displays, video and still cameras, microphones, user input devices (e.g., touchscreens, mice, keyboards and the like) and USB devices. In some cases, the I/O interface 518 includes the peripherals, such as displays and user input devices, for being accessed by the merchant 290, agent 130, source 140 and/or courier 150 to perform any of the actions noted in FIGS. 1-4.

The device 500 may have as lock similar to lock 114 that secures access to the device 500 or the capability to use the I/O interface 518 so that the device 500 can only be accessed by a person having a password, a key code, a lock combination, a magnetic code, an electronic code, a wireless code, or other permission as known for secure computing devices. For example, a lock of the device 500 may allow access to the device 500 during various periods of time by the merchant 290, agent 130, source 140 and/or courier 150 who has permission. The device 500 may include additional components.

In some cases, storage 514 is a non-volatile machine-readable storage medium that includes all types of computer readable media, including magnetic storage media, optical storage media, and solid state storage media. It should be understood that the software can be installed in and sold with the safe 110, the device 112 and/or the other components of the system 100. Alternatively, the software can be obtained and loaded into the safe 110, the device 112 and/or the other components of the system 100, including obtaining the software via a disc medium or from any manner of network or distribution system, including from a server owned by the software creator or from a server not owned but used by the software creator. The software can be stored on a server for distribution over the Internet.

By providing physical article exchange of coins for cash in the safe 110, using the safe 110, the device 112 and/or the other components of the system 100 increase computer efficiency because they provide a quicker, automated and more accurate currency exchange delivery and reconciliation process than current exchange processes and devices. Specifically, the devices and methods herein are quicker and more efficient because they allow a merchant to select and exchange on the safe 100, causing an automated message of the exchange to go to the agent 130, source 140 and courier 150 who performs the exchange at the safe 110. Thus, the exchange herein is automatically performed from and at the safe. It also allows the value of the cash 170 deposited into the safe to be reconciled or equated with the value of the coins 172 exchanged for the cash at the safe. Thus, the exchange herein it is more accurate. Consequently, the computing devices 112 herein (e.g. device 112) are more efficient because they can automatically cause the exchange to be performed at the safe 100 without further input or action by the merchant 290 other than selecting the exchange, agent 130, source 140 other than providing the coins 172 or courier 150 other than making the exchange at the safe. Prior technologies do have such improvements.

For example, providing physical article exchange of coins for cash using the safe 110, the device 112 and/or the other components of the system 100 avoids the need for a merchant to make a phone call into an automated system to request a currency or coin exchange. In that case when the courier arrives, the coin/currency is exchanged for the cash at the safe's location. However, the cash that was provided to courier at the safe was not validated and counting errors could have occurred causing the value of cash to not equal the value of the coins. On the other hand, the devices and processes herein provide quicker, automated and more accurate currency exchange delivery and reconciliation than the prior phone call processes.

Also, for example, providing physical article exchange of coins for cash using the safe 110, the device 112 and/or the other components of the system 100 avoids the need for a merchant to contact their financial institution or bank to place their change order request. During that process the customer specifies the amount of the order, denomination of the order, and the delivery date of the order. The financial institution debits the customer's account for the amount of the change order. The customer then deposits cash in the amount of the change order into the smart safe. When the safe sends the instore credit file, the change order amount is separate from the store deposit. Depending on the financial institutions credit file, the credits may or may not credit the customer in a different post from the cash sales for the day. This a two-step process which could result in a mismatch of amounts, and the debit/credits may hit the customer's account on different days creating reconciliation issues. On the other hand, the devices and processes herein provide quicker, automated and more accurate currency exchange delivery and reconciliation than the prior contact the financial institution process. For example, by using the devices and processes herein for the two-step process above, the mismatch of amounts, and the debit/credits hitting the customer's account on different days will not create reconciliation issues because they will be accounted for using the information 117 and optionally the confirmation 180 from the safe.

Although shown implemented in a personal computer, the processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including variations of the Linux, Microsoft Windows, Symbian, and Apple Mac operating systems.

The techniques may be implemented with machine readable storage media in a storage device included with or otherwise coupled or attached to a computing device. That is, the software may be stored in electronic, machine readable media. These storage media include magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

The safe 110, safe 110, the device 112 and/or the other components of the system 100 may include a physical article exchange unit and/or a computing unit. These units may be hardware, software, firmware, or a combination thereof. Additional and fewer units, modules or other arrangement of software, hardware and data structures may be used to achieve the processes and apparatuses described herein.

Closing Comments

Throughout this description, the technologies described and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one technology are not intended to be excluded from a similar role in other technologies.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for exchanging coins for cash using a safe comprising:
- the safe receiving a selection from a merchant to exchange cash having a total cash value for coins having a total coin value;
- the safe receiving from the merchant and securing, the cash having the total cash value of the merchant selection within a secure chamber of the safe;
- the safe determining existence in the secure chamber of the cash having the total cash value of the merchant selection;
- the safe determining if the cash having the total cash value of the merchant selection exists in the safe at a first time, and if so, sending information to an exchange agent, the information including:
  - the selection from the merchant to exchange cash having the total cash value of the merchant selection with coins having the total coin value of the merchant selection; and
  - the determination of the existence in the secure chamber of cash having the total cash value of the merchant selection;
- the safe receiving from a courier a selection to remove cash having the total cash value of the merchant selection from the secure chamber, wherein the courier is dispatched by one of the exchange agent or a bank to retrieve a deposit from the safe and deliver the deposit to the bank.

2. The method of claim 1, wherein the safe receiving from the merchant and securing, the cash having the total cash value of the merchant selection includes the safe receiving from the merchant and securing within the secure chamber, a money deposit having a total monetary value greater than the cash having the total cash value of the merchant selection; and further comprising:
- the exchange agent calculating a reduced total monetary value of the money deposited as the total monetary value minus the total cash value of the merchant selection; and
- the exchange agent receiving the information sent by the safe, storing the information and sending updated information to the bank, the updated information including the reduced total monetary value of the money deposited.

3. The method of claim 2, wherein receiving the selection from the merchant includes receiving denominations of the total cash value of the merchant selection and receiving denominations of the total coin value of the merchant selection.

4. The method of claim 3, further comprising the exchange agent sending a report to the merchant, the report including:
- the selection from the merchant to exchange,
- denominations of the total cash value of the merchant selection and denominations of the total coin value of the merchant selection,
- the total cash value of the cash that existed in the safe,
- the total cash value of the merchant selection that was removed from the safe, and
- the reduced total monetary value sent to the bank.

5. The method of claim 1, further comprising:
- the safe identifying the removal from the chamber of cash having the total cash value of the merchant selection.

6. The method of claim 1, wherein the safe sending information to the exchange agent includes the safe confirming that a network connection can be made to send the information from the safe to the exchange agent by verifying that an immediately prior synchronization with a network was successful or initiating a new synchronization with the network.

7. The method of claim 1, wherein the courier receives a message requesting the exchange cash having the total cash value of the merchant selection with coins having the total coin value of the merchant selection; and wherein the message is from the exchange agent or the bank.

8. The method of claim 1, wherein the courier is hired by one of the merchant, the exchange agent or the bank to receive a merchant's initiation of the deposit and/or exchange process.

9. A non-volatile machine readable medium storing a program having instructions which when executed by a processor will cause the processor to exchange coins for cash using a safe, the instructions of the program for:
- receiving a selection from a merchant to exchange cash having a total cash value for coins having the total coin value;
- determining existence in the secure chamber of the cash having the total cash value of the merchant selection;
- determining if the cash having the total cash value of the merchant selection exists in the safe at a first time, and if so, sending information to an exchange agent, the information including:
  - the selection from the merchant to exchange cash having the total cash value of the merchant selection with the coins having the total coin value of the merchant selection; and
  - the determination of the existence in the secure chamber of cash having at least the total cash value of the merchant selection;
- the safe identifying a courier dispatched by one of the exchange agent or a bank to retrieve a deposit from the safe and deliver the deposit to the bank;
- the safe receiving from a courier a selection to remove cash having the total cash value of the merchant selection from the secure chamber.

10. The medium of claim 9, wherein receiving from the merchant and securing, the cash having the total cash value of the merchant selection includes receiving from the merchant and securing within the secure chamber, a money deposit having a total monetary value greater than the cash having the total cash value of the merchant selection; and further comprising:
- calculating a reduced total monetary value of the money deposited as the total monetary value minus the total cash value of the merchant selection; and
- sending updated information to the bank, the updated information including the reduced total monetary value of the money deposited.

11. The medium of claim 10, wherein receiving the selection from the merchant includes receiving denominations of the total cash value of the merchant selection and receiving denominations of the total coin value of the merchant selection.

12. The medium of claim 9, wherein sending information to the exchange agent includes confirming that a network connection can be made to send the information from the safe to the exchange agent by verifying that an immediately prior synchronization with a network was successful or initiation a new synchronization with the network; and further comprising:

identifying the removal from the chamber of cash having the total cash value of the merchant selection.

13. The medium of claim 9, further comprising:

a user input device a display device a processor a memory wherein the processor and the memory comprise circuits and software for performing the instructions on the medium.

14. The medium of claim 9, wherein:

determining that cash having the total cash value of the merchant selection exists in the safe at the first time is initiated by receiving a first user input at the safe computing device; and determining that coins having the total coin value of the merchant selection exist in the safe and cash having the total cash value of the merchant selection is removed from the safe at the second time comprises receiving a second user input at the safe computing device.

15. A method for exchanging coins for cash using a safe comprising:

the safe receiving a selection from a merchant to exchange cash having a total cash value for coins having a total coin value;

the safe receiving from the merchant and securing, the cash having the total cash value of the merchant selection within a secure chamber of the safe;

the safe determining if the cash having the total cash value of the merchant selection exists in the safe, A) and if so, sending information to an exchange agent, the information including:

the selection from the merchant to exchange cash having the total cash value of the merchant selection with coins having the total coin value of the merchant selection;

the determination of the existence in the secure chamber of cash having the total cash value of the merchant selection;

B) and if not, reporting an error message to one of a courier or the exchange agent indicating that cash received from the merchant is insufficient for the selected exchange, wherein the courier is dispatched by one of the exchange agent or a bank to retrieve a deposit from the safe and deliver the deposit to the bank.

16. The method of claim 15, wherein the safe receiving from the merchant and securing, the cash having the total cash value of the merchant selection includes the safe receiving from the merchant and securing within the secure chamber, a money deposit having a total monetary value greater than the cash having the total cash value of the merchant selection; and further comprising:

the exchange agent calculating a reduced total monetary value of the money deposited as the total monetary value minus the total cash value of the merchant selection; and the exchange agent receiving the information sent by the safe, storing the information and sending updated information to the bank, the updated information including the reduced total monetary value of the money deposited.

17. The method of claim 16, wherein receiving the selection from the merchant includes receiving denominations of the total cash value of the merchant selection and receiving denominations of the total coin value of the merchant selection.

18. The method of claim 17, further comprising the exchange agent sending a report to the merchant, the report including:

the selection from the merchant to exchange, denominations of the total cash value of the merchant selection and denominations of the total coin value of the merchant selection, the total cash value of the cash that existed in the safe, the total cash value of the merchant selection that was removed from the safe, and the reduced total monetary value sent to the bank.

19. The method of claim 15, wherein the safe sending information to the exchange agent includes the safe confirming that a network connection can be made to send the information from the safe to the exchange agent by verifying that an immediately prior synchronization with a network was successful or initiating a new synchronization with the network.

20. A non-volatile machine readable medium storing a program having instructions which when executed by a processor will cause the processor to exchange coins for cash using a safe, the instructions of the program for:

receiving a selection from a merchant to exchange cash having a total cash value for coins having the total coin value;

identifying a courier dispatched by one of an exchange agent or a bank to retrieve a deposit from the safe and deliver the deposit to the bank;

determining if the cash having the total cash value of the merchant selection exists in the safe, A) and if so, sending information to the courier, the information including:

the selection from the merchant to exchange cash having the total cash value of the merchant selection with the coins having the total coin value of the merchant selection; and the determination of the existence in the secure chamber of cash having at least the total cash value of the merchant selection;

B) and if not, reporting an error message to the courier indicating that cash received from the merchant is insufficient for the selected exchange, wherein the courier is dispatched by one of the exchange agent or the bank to retrieve the deposit from the safe and deliver the deposit to the bank.

21. The medium of claim 20, wherein receiving from the merchant and securing, the cash having the total cash value of the merchant selection includes receiving from the merchant and securing within the secure chamber, a money deposit having a total monetary value greater than the cash having the total cash value of the merchant selection; and further comprising:

calculating a reduced total monetary value of the money deposited as the total monetary value minus the total cash value of the merchant selection; and sending updated information to the bank, the updated information including the reduced total monetary value of the money deposited.

22. The medium of claim 20, wherein receiving the selection from the merchant includes receiving denominations of the total cash value of the merchant selection and receiving denominations of the total coin value of the merchant selection.

23. The medium of claim 20, further comprising:

a user input device a display device a processor a memory wherein the processor and the memory comprise circuits and software for performing the instructions on the storage medium.

* * * * *